United States Patent [19]
Lim

[11] Patent Number: 5,654,986
[45] Date of Patent: Aug. 5, 1997

[54] METHOD AND APPARATUS FOR DECODING TRELLIS CODED QAM SIGNALS

[75] Inventor: Yong-Hee Lim, Seoul, Rep. of Korea

[73] Assignee: Daewoo Electronics Co., Ltd, Seoul, Rep. of Korea

[21] Appl. No.: 367,531

[22] Filed: Dec. 30, 1994

[30] Foreign Application Priority Data

Apr. 30, 1994 [KR] Rep. of Korea ............. 94-9496

[51] Int. Cl.$^6$ ............................................. H04L 27/06
[52] U.S. Cl. ................................................. 375/341
[58] Field of Search .............................. 375/261, 265, 375/340, 341, 262, 264, 342; 329/304; 371/43

[56] References Cited

U.S. PATENT DOCUMENTS

| | | | |
|---|---|---|---|
| 4,493,082 | 1/1985 | Cumberton et al. | 371/43 |
| 4,520,490 | 5/1985 | Wei | 375/261 |
| 4,562,425 | 12/1985 | Turner et al. | 375/261 |
| 4,831,635 | 5/1989 | Lee et al. | 375/265 |
| 4,901,331 | 2/1990 | Calderbank et al. | 375/265 |
| 4,941,154 | 7/1990 | Wei | 375/265 |
| 5,150,381 | 9/1992 | Forney, Jr. et al. | 375/261 |
| 5,233,629 | 8/1993 | Paik et al. | 375/260 |
| 5,347,569 | 9/1994 | Yamamoto | 375/216 |

*Primary Examiner*—Tesfaldet Bocure
*Attorney, Agent, or Firm*—Anderson Kill & Olick

[57] ABSTRACT

A decoding apparatus decides a symbol point in a $2^N$-Quadrature Amplitude Modulation("QAM") constellation pattern in response to a modulation function, wherein the $2^N$-QAM constellation pattern is divided into 4 subsets, each subset including $2^{N-2}$ symbol points of the constellation pattern; the modulation function representing a N-bit data including 2-bit codeword which indicates a subset of the constellation pattern and (N-2) remaining bits which indicate a symbol point in the subset; and N is an integer greater than 2. The decoding apparatus comprises a metric deciding block for determining an I and Q metrics based on a signal point represented by the modulation function, wherein the I and Q output metrics are determined such a way that the determined I and Q metrics designate a subset of a nearest symbol point from the signal point; a Viterbi decoder for deciding a subset in response to the I and Q metrics, thereby providing a first bit indicating the subset; a hard-decision block for deciding the (N-2) remaining bits; and a decoding block for providing a decoded output for the modulation function in response to the first bit and the (N-2) remaining bits.

3 Claims, 7 Drawing Sheets

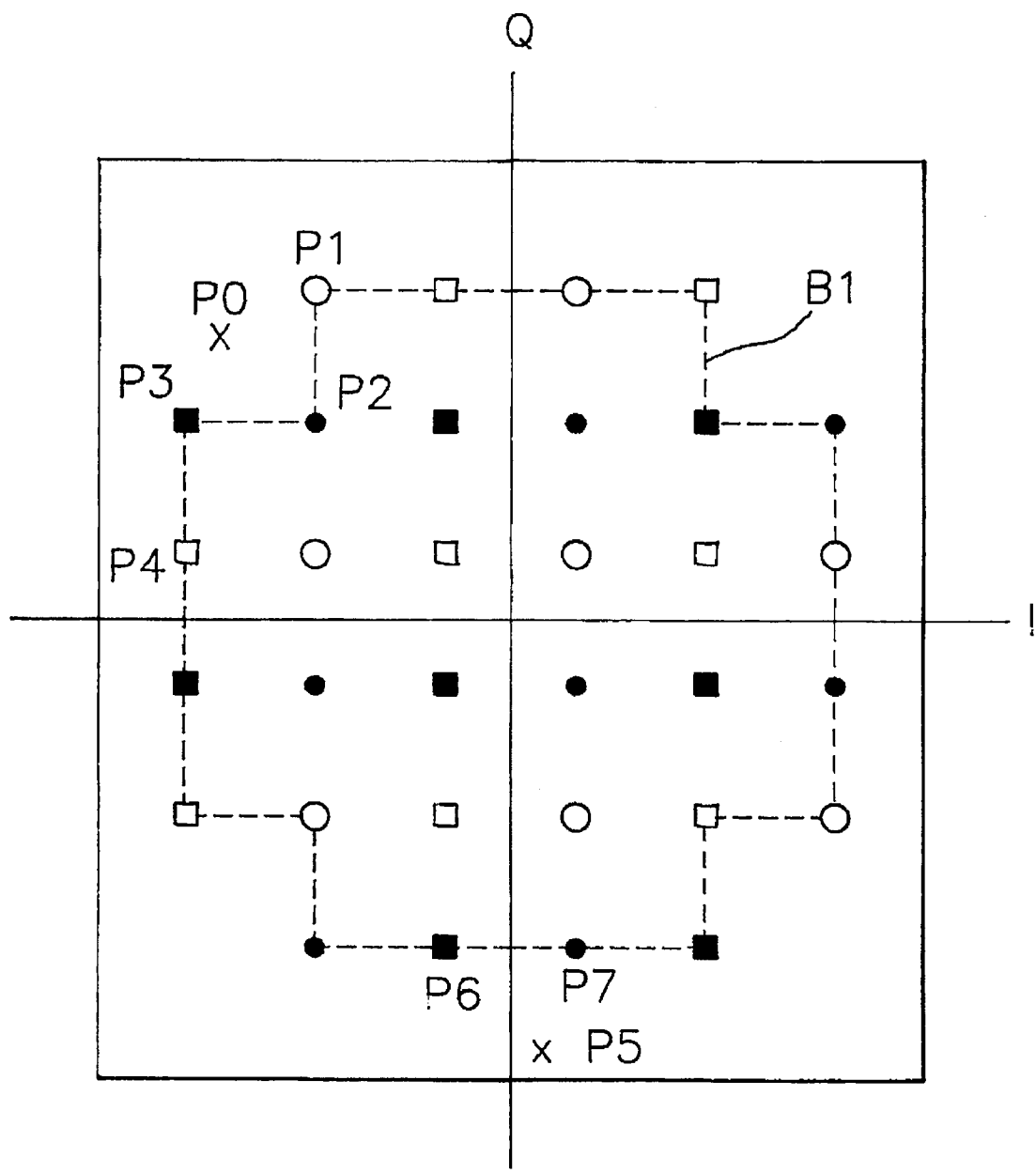

| SUBSET LABELING | |
|---|---|
| SUBSET | BINARY LABEL m1m0 |
| ○ | 00 |
| ● | 10 |
| □ | 01 |
| ■ | 11 |

METHOD AND APPARATUS FOR DECODING TRELLIS CODED QAM SIGNALS

FIELD OF THE INVENTION

The present invention relates to a trellis coded Quadrature Amplitude Modulation("QAM"); and, more particularly, to a method for decoding digital data which has been coded and transferred by using a trellis coded QAM.

DESCRIPTION OF THE PRIOR ART

Digital data, for example, digitized video signals for use in broadcasting high definition television signals, can be transmitted over terrestrial VHF or UHF analog channels for communication to end users. Analog channels tend to deliver corrupted and transformed versions of their input waveforms. Corruption of the waveform, usually statistical, may be additive and/or multiplicative of, e.g., possible background thermal noises, impulse noises and fades.

In order to communicate digital data via an analog channel, the data is preferably modulated using, for example, a form of Pulse Amplitude Modulation("PAM"). Typically, a Quadrature Amplitude Modulation("QAM") is used to increase the amount of data that can be transmitted within an available channel bandwidth. The QAM is a form of PAM wherein a plurality of bits of information are transmitted in a pattern referred to as a "constellation" that can contain, for example, sixteen or thirty-two points.

In PAM, each signal is a pulse whose amplitude level is determined by a transmitted symbol. In a 32-QAM, symbol amplitudes of −5, −3, −1, 1, 3, 5 in each quadrature channel are typically used.

Bandwidth efficiency in digital communication systems is normally defined in terms of the number of transmitted bits per second per unit of bandwidth, i.e., the ratio of the data rate to the bandwidth. In short, QAM provides a bandwidth efficient modulation.

On the other hand, the so-called trellis coded modulation (TCM) has evolved as a combined coding and modulation technique for digital transmission over band-limited channels. It allows the achievement of significant coding gains over a conventional uncoded multilevel modulation, such as QAM, without compromising its bandwidth efficiency. TCM schemes utilize redundant nonbinary modulation in combination with a finite-state encoder which governs the selection of modulation signals to generate coded signal sequences. In a receiver, transmitted signals containing the noises are decoded by a soft-decision maximum likelihood sequence decoder. Such schemes can improve the robustness of digital transmission against additive noises by 3–6 Db or more, compared with the conventional uncoded modulation. These gains are obtained without bandwidth expansion or reduction of the effective information rate as required by other known error correction schemes. The term "trellis" is used because these schemes can be described by a state-transition (trellis) diagram similar to the trellis diagrams of binary convolutional codes. The difference is that TCM extends the principle of convolutional coding to nonbinary modulation with signal sets of an arbitrary size.

A more extensive discussions on TCM is given in, e.g., G. Ungerboeck, "Trellis-Coded Modulation with Redundant Signal Sets—Part I:Introduction; Part II:State of the Art", *IEEE Communication Magazine*, Vol. 25, No. 2, pp.5–21, February, 1987.

In FIG. 1, there is shown a block diagram of a conventional TCM encoding system. In the conventional encoding system for QAM transmission, an (N-1) bit input symbol is first parsed into a first bit on a line 30 and the (N-2) remaining bits on a line 20 at a parsing block 10 shown in FIG. 1. The first bit is encoded by employing a rate ½ binary convolutional encoding algorithm at a convolutional encoder 40, to thereby provide on a line 45 a two-bit codeword that defines one of four subsets of a $2^N$-QAM constellation pattern, wherein each subset includes $2^N/4$ symbol points of the constellation pattern. The remaining bits correlate the input symbol with one of the $2^N/4$ symbol points included in the subset defined by the codeword. Specifically, at a $2^N$-QAM mapper 50, the codeword is mapped with the N-2 remaining bits to provide a modulation function which includes I and Q components to indicate a specific point on the QAM constellation pattern. The modulation function is further processed, e.g., modulated with a carrier for transmission on a communication channel (see, e.g., U.S. Pat. No. 5,233,629 issued to W. H. Paik et al.).

In FIG. 2A, there is shown a conventional 32-QAM constellation pattern divided into 4 subsets. A modulation function at the encoding system corresponds to one of the symbol points shown in FIG. 2A. Four different subsets are represented by four different shaped points as depicted in FIG. 2B. A label for each symbol point includes 5 bits as shown in FIG. 2C. The coded bits, i.e., m0 and m1, represent a subset while the remaining bits, i.e., m2 to m4, determine the specific points in each subset. Points with a same set of m0 and m1 values are included in a same subset as designated by FIG. 2B.

At a corresponding decoding system, a received signal is first demodulated to recover modulation functions in which a two-bit codeword identifies one of the four QAM constellation subsets and the remaining (N-2) bits represent a signal point included therein. Each of the modulation functions is pruned to provide a set of I and Q metrics and (N-2) remaining bits. The metrics are used for decoding a rate ½ binary convolutional code to recover the first bit. Specifically, the metrics are used in conjunction with a decoder that uses a soft-decision algorithm for decoding the convolutional code. By using a soft-decision maximum likelihood decoder, e.g., Viterbi decoder, the error occurred in the first bit can be effectively corrected, thereby enabling the determination of a subset corresponding to the modulation function.

The remaining bits are determined, by using a hard-decision method, from the modulation function. As a rule, the longer the distance between two symbol points, the easier it is to determine a correct symbol point corresponding to the modulation function. The minimum distance between two symbol points of a same subset is twice the minimum distance between two neighboring symbol points (see FIG. 2A); and, accordingly, once the subset is correctly determined by using the maximum-likelihood decoder, the remaining bits can be recovered accurately by the hard decision method. The recovered first bit and the remaining bits are further processed in the decoding system to provide a decoded output.

However, in case the modulation function exceeds a certain limit, e.g., a boundary B1 indicated by dotted lines in FIG. 2A, the recovered first bit can be different from that of the encoding part. For example, in case the modulation function corresponds to a signal point P0 shown in FIG. 2A, m1 and m0 for that signal are most likely to be estimated as '0' and '1', respectively. However, a symbol point with the estimated m1 and m0 values, e.g., a symbol point P4, is much farther than symbol points P1, P2 and P3, whose m1 and m0 values are different from the estimated ones.

3

Therefore, in that case, it is preferable to decide the received signal as one of the three neighboring symbol points.

SUMMARY OF THE INVENTION

It is, therefore, a primary object of the present invention to provide a novel method and apparatus for deciding I and Q metrics for a received signal which lies outside of a predetermined boundary of a 32-QAM constellation pattern, thereby rendering it possible to determine a symbol point corresponding to the received signal accurately.

In accordance with the present invention, there is provided an apparatus for deciding a symbol point in a $2^N$-QAM constellation pattern in response to a modulation function, wherein the $2^N$-QAM constellation pattern is divided into 4 subsets, each subset including $2^{N-2}$ symbol points of the constellation pattern, the modulation function representing a N-bit data including a 2-bit codeword which indicates a subset of the constellation pattern and (N-2) remaining bits which indicate a symbol point in the subset, and N is an integer greater than 2, the apparatus comprising:

means for determining an I and Q metrics based on a signal point represented by the modulation function, wherein the I and Q metrics obtained from the signal point are selected as the I and Q output metrics if the signal point resides inside of a boundary of the $2^N$-QAM constellation pattern, and if the signal point lies outside of the boundary, the I and Q output metrics are determined such that the determined I and Q metrics designate a subset of a nearest symbol point from the signal point;

decoder means for deciding a subset in response to the I and Q metrics by using a soft decision algorithm for a rate ½ binary convolutional code, thereby providing a first bit representing the subset;

decision means for deciding the (N-2) remaining bits by using a hard-decision method in response to the modulation function; and means for providing a decoded output for the modulation function in response to the first bit and the (N-2) remaining bits.

BRIEF DESCRIPTION OF THE DRAWINGS

The above and other objects and features of the present invention will become apparent from the following description of preferred embodiments given in conjunction with the accompanying drawings, in which:

FIG. 2A presents a 32-QAM constellation pattern divided into 4 subsets;

DETAILED DESCRIPTION OF THE PREFERRED EMBODIMENTS

Figure 3:
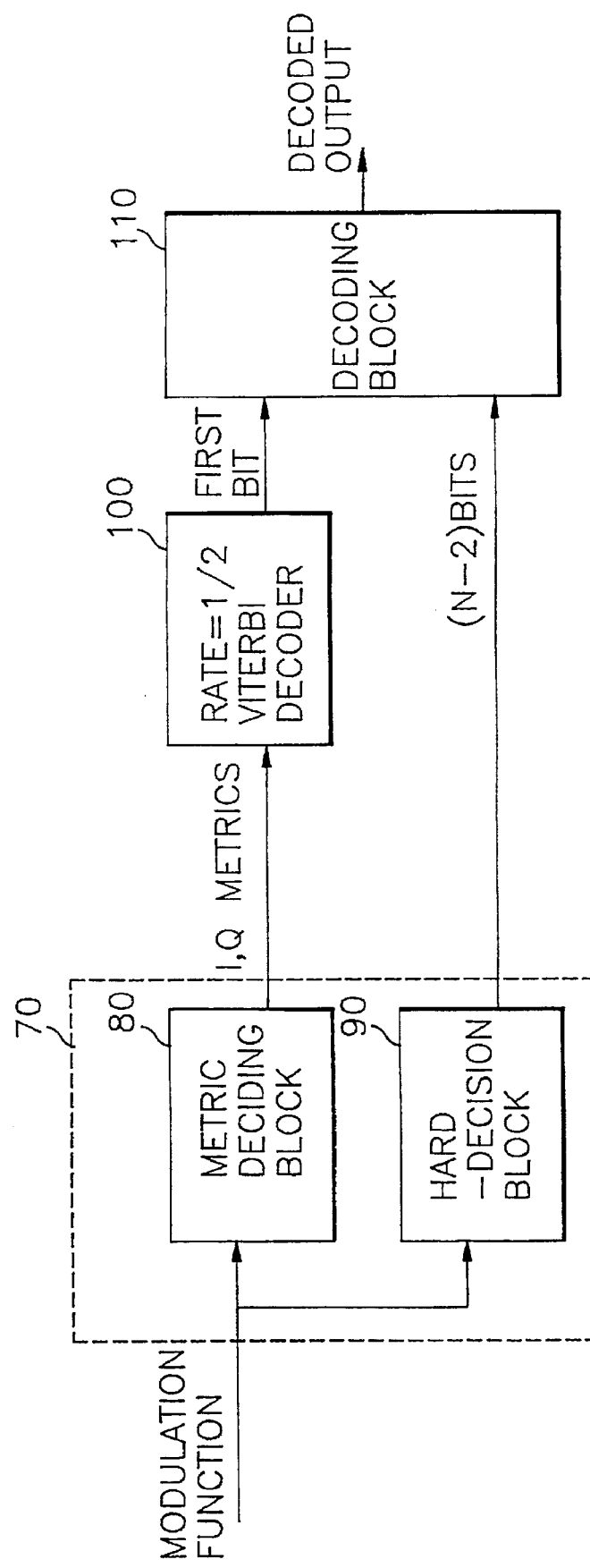
FIG. 3 offers an apparatus for decoding a 32-QAM modulation function in accordance with the present invention.

Referring to FIG. 3, there is shown a decoding system in accordance with the present invention for decoding a received QAM modulation function corresponding to a signal point on a $2^N$, e.g., 32, QAM constellation pattern, wherein N is an integer larger than 2. The modulation function represents an N, e.g., 5, bit data wherein a 2-bit codeword, encoded from a first bit of an input symbol, determines a subset of the constellation pattern and the (N-2), e.g., 3, remaining bits determine a symbol point in the subset.

The received modulation function is an input to a pruning block 70, which includes a metric deciding block 80 for providing I and Q metrics to be used in determining a subset corresponding to the modulation function. The pruning block 70 also includes a hard-decision block 90 which provides 3 remaining bits. The metric deciding block 80 determines the Q and I metrics in accordance with the present invention as will be presented with reference to FIGS. 4 and 5. Specifically, first, the Q and I metrics are determined conventionally according to the position of the signal point, then the position of the signal point is checked to see if it lies outside of a predetermined boundary, e.g, B1 shown in FIG. 2A, on the QAM constellation pattern. In case the signal point lies inside the boundary, the Q and I metrics are fed to a Viterbi decoder 100 to determine the first bit representing the subset. Otherwise, i.e., the signal point lies outside of the boundary B1, the Q and I metrics are converted as will be presented with reference to FIGS. 5A to 5C and fed to the Viterbi decoder 100, thereby determining the first bit.

The Viterbi decoder 100 decodes an accumulated history of the metrics received from the metric deciding block 80 into the first bit.

The recovered first bit and the 3 remaining bits are coupled to a decoding block 110, to be further processed therein to provide a decoded output.

Figure 1:
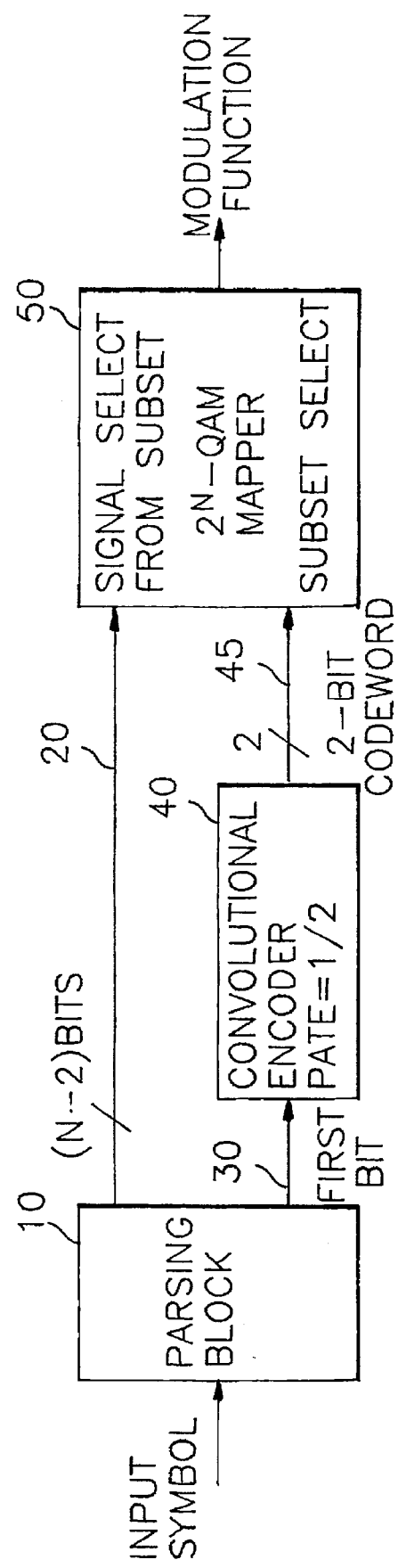
FIG. 1 shows a block diagram of a conventional trellis encoder.
Figures 2B, 2C:
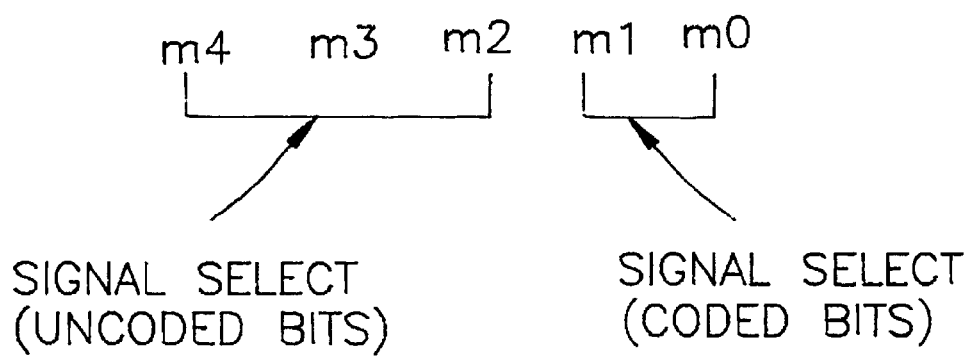
FIG. 2B provides a diagram defining the labeling of subsets in the constellation pattern of FIG. 2A.
FIG. 2C depicts a diagram explaining the labeling of symbol points in the constellation pattern of FIG. 2A.
Figure 4A:
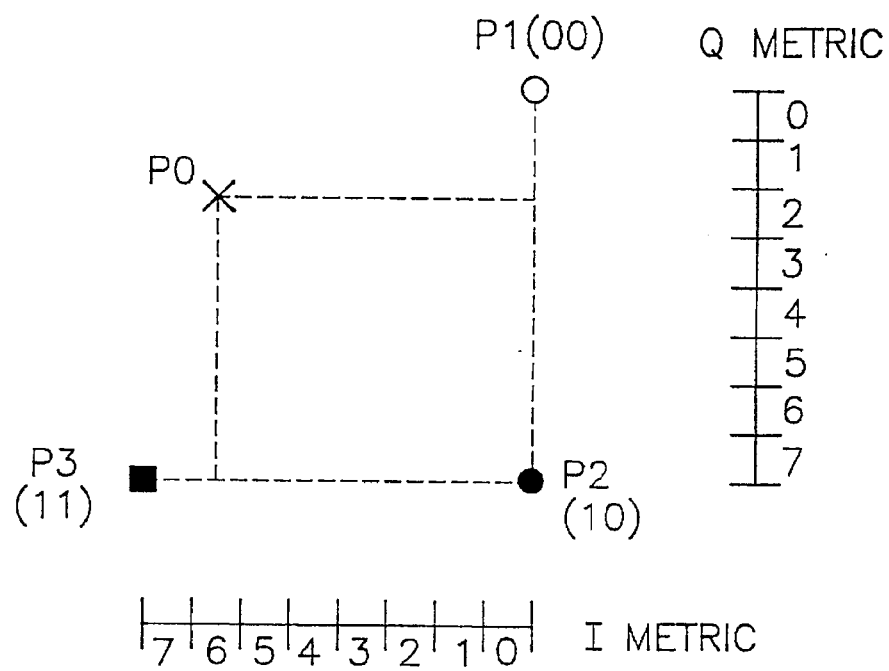
FIG. 4A illustrates an upper left corner of the diagram shown in FIG. 2A.

Referring to FIG. 4A, there is shown an upper left corner of the 32-QAM constellation pattern of FIG. 2A. The 2 bits in the parenthesis are m1 and m0 shown in FIG. 2B which indicate the subset where a given point belongs. In a conventional decoding system, in case the received modulation function is located at a signal point P0, the Q and I metrics may be decided as 2 and 6, respectively. Therefore, the corresponding values of m1 and m0 are most likely to be estimated as '01' in the Viterbi decoder 100 shown in FIG. 3. However, there is no corresponding symbol point which has the value '01' near P0. For three neighboring symbol points, i.e., P1, P2, and P3, thereof have values '00', '10' and '11', respectively. Therefore, it may be preferable to design a scheme to estimate or select a symbol point for the signal point P0 from three adjacent symbol points P1, P2 and P3.

Figure 4B:
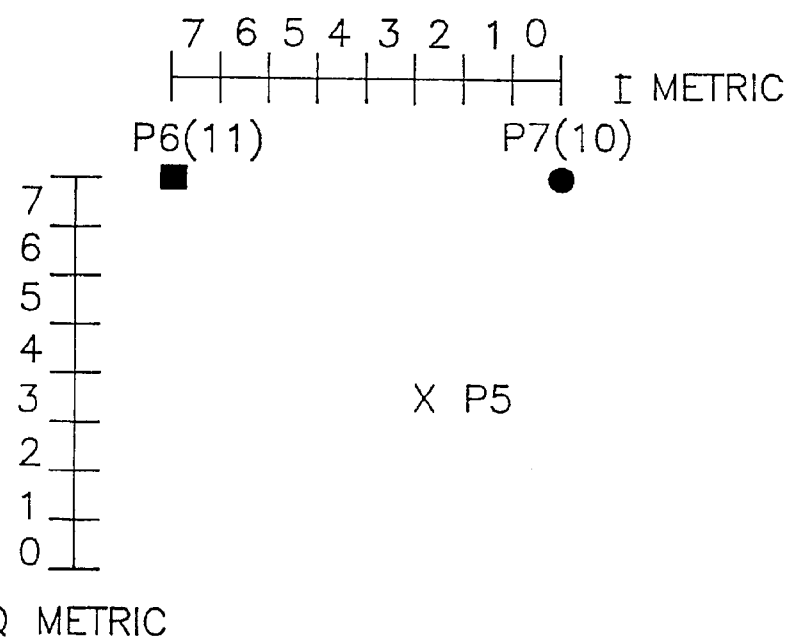
FIG. 4B represents a lower part of the diagram shown in FIG. 2A.

Referring to FIG. 4B, there is shown another illustration wherein a received signal point P5 lies outside the boundary B1 shown in FIG. 2A. In the conventional decoding system, the Q metric may be decided as 5 and corresponding m1 value is most likely to be estimated as '0'. Since the value of m1 for P6 and P7 is '1' it would be preferable to assign a value, e.g., 7, as the Q metric of the signal point P5 so that the signal on P5 can be approximated to the symbol point P6 or P7.

Figure 5A:
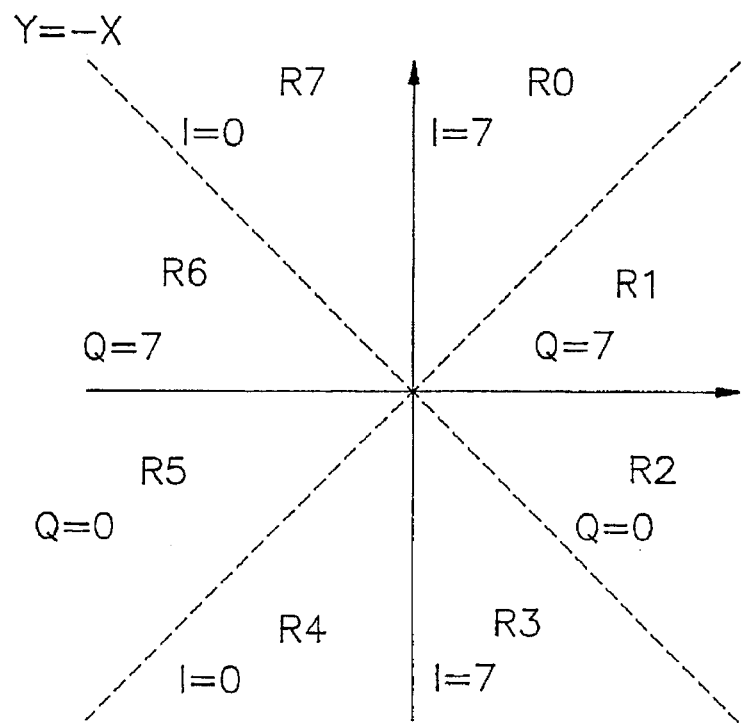
FIGS. 5A to 5C describe a scheme for deciding I and Q metric when a received signal exceeds the boundary defined in FIG. 2A.
Figure 5B:
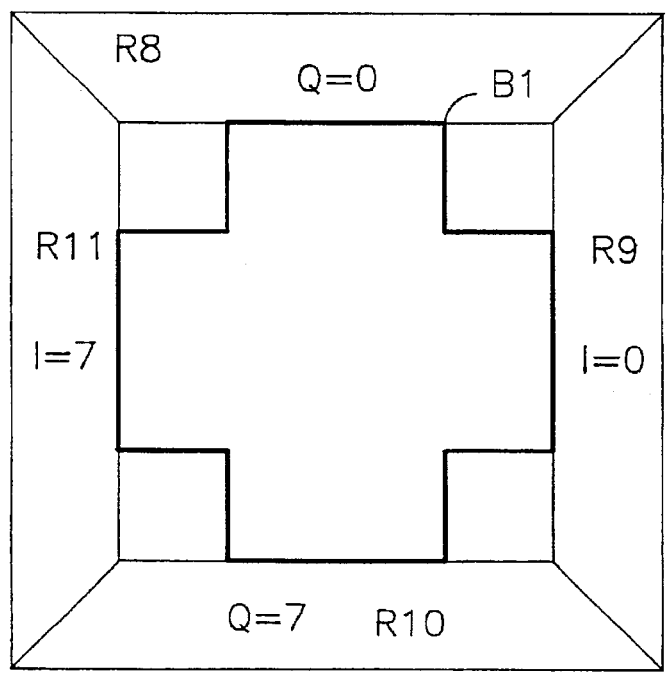
Figure 5C:
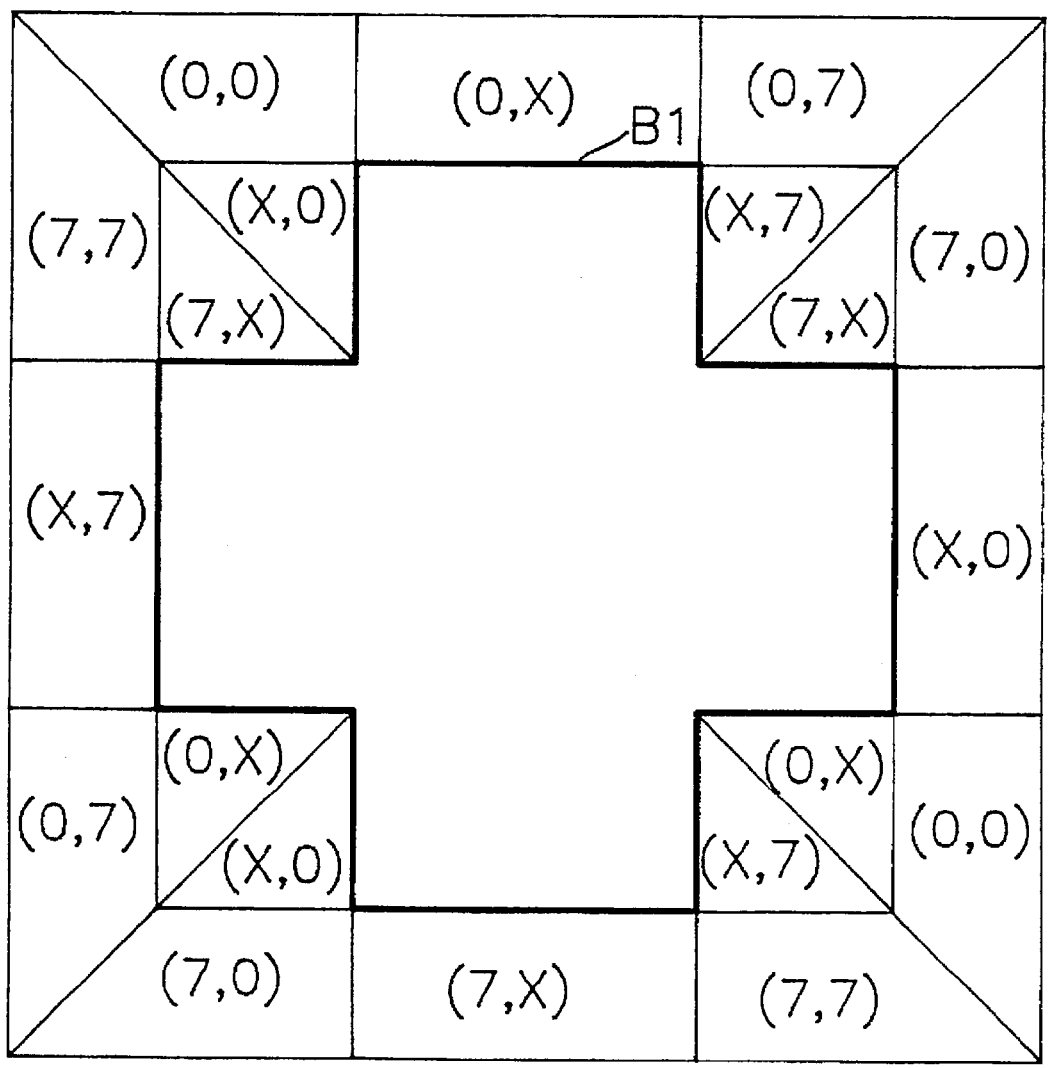

Referring to FIGS. 5A to 5C, there is shown a scheme for converting I and Q metrics to decide a more accurate symbol point when the received signal point lies outside the boundary B1 shown in 2A.

FIG. 5A shows a scheme for determining Q and I metrics when a received signal point lies at a corner of the constellation pattern. When the received signal point lies in a region R6 shown in FIG. 5A, a Q metric is set to 7 irrespective of the quadrature amplitude component of the received modulation function. Referring back to FIG. 4A, the Q metric for the received signal point P0 is set to 7 using the scheme of FIG. 5A. The complete Q and I metrics for the signal point P0 are (7, 6), and the corresponding symbol point is decided as P3, which is in fact the nearest symbol point of the received signal point P0. By the same token, as shown in FIG. 5A, a Q metric for a received signal point in a region R1 is set to 7 irrespective of the quadrature amplitude component of the received modulation function, and 0, for a signal point in a region R2 or R5; and an I metric is set to 7 for a signal point in a region R0 or R3, and 0, for a signal point in a region R4 or R7.

FIG. 5B shows another scheme for determining I and Q metrics when a received signal point lies in one of the four side regions of the constellation pattern, R8, R9, R10 and R11. When the received signal point lies in region R10 shown in FIG. 5B, the Q metric is set to 7 irrespective of the quadrature amplitude component of the received modulation function. Referring back to FIG. 4B, the Q metric for the received signal point P5 is set to 7 using the scheme of FIG. 5B. The complete Q and I metrics for the point P5 become (7, 2), and the corresponding symbol point is decided as P7, which is the nearest symbol point for the received signal point P5. Similarly, a Q metric of a signal point residing in a region R8 is set to 0, while I metrics for signal points in regions R9 and R11 are set to 0 and 7, respectively.

The schemes shown in FIGS. 5A and 5B are summarized in FIG. 5C, wherein two numerals in the parenthesis denote Q and I metrics, respectively; and X in the parenthesis represents a Q or I metrics obtained from the quadrature amplitude component of a received signal point.

As explained above, by converting the I and/or Q metric of a received signal into a predetermined value(s), the received signal can be mapped into a nearest symbol point.

While the present invention has been described with respect to the particular embodiments, it will be apparent to those skilled in the art that various changes and modifications may be made without departing from the spirit and scope of the invention as defined in the following claims.

What is claimed is:

1. A decoding system for recovering a data symbol from a transmitted signal point, said data symbol including a first bit and N-1 remaining bits, N being an integer larger than 1, the first bit of the data symbol being coded by a ½ convolutional encoder to provide two coded bits, a modulated signal point corresponding to a combination of the two coded bits and said N-1 remaining bits being selected among $2^{N+1}$ predetermined signal points of a $2^{N+1}$-quadrature amplitude modulation ("$2^{N+1}$-QAM") constellation pattern on a 2-dimensional ("2-D") signal plane wherein said $2^{N+1}$ predetermined signal points are divided into 4 subsets, each of the subsets consists of $2^{N-1}$ points such that any two neighboring points belong to different subsets and the two coded bits designate a subset and said N-1 remaining bits designate a signal point in the subset such that first coded bits for signal points having a same horizontal coordinate on the 2-D signal plane are identical to each other and second coded bits for signal points having same vertical coordinate on the 2-D signal plane are identical to each other, and the modulated signal point being transmitted by a channel to form the transmitted signal point, said decoding system comprising:

means for providing a Q and an I bit metrics in response to the transmitted signal point wherein the Q and the I metrics are determined based on a vertical and a horizontal coordinates of the transmitted signal point, respectively, and each of the Q and the I metrics is an integer ranging from 0 to K, K being an integer larger than 0;

means for converting the Q bit metric if the transmitted signal point resides upper or lower than all squares formed by 4 neighboring signal points of the $2^{N+1}$-QAM constellation pattern and converting the I bit metric if the transmitted signal point is located farther to the left or right than all squares formed by 4 neighboring signal points of the $2^{N+1}$-QAM constellation pattern, to thereby provide modified Q and I bit metrics, wherein the I or the Q bit metric is converted to 0 in case the first coded bit or the second coded bit for a nearest signal point from the transmitted signal point is 0, respectively, and the I or the Q bit metric is converted to K in case the first coded bit or the second coded bit for a nearest signal point from the transmitted signal point is 1, respectively;

decoding means for determining the first bit of the data symbol based on the modified Q and I bit metrics; and means for deciding said N-1 remaining bits of the data symbol in response to the transmitted signal point.

2. The decoding system of claim 1, wherein the decoding means includes a soft-decision Viterbi decoder.

3. The decoding system of claim 1, wherein K is 7.

\* \* \* \* \*